United States Patent [19]

Ougiya et al.

[11] Patent Number: 5,228,472
[45] Date of Patent: Jul. 20, 1993

[54] VALVE UNIT FOR PIPELINE EQUIPPED WITH DOUBLE FLOW TUBE

[75] Inventors: Takashi Ougiya; Tomoyuki Sato, both of Tokyo, Japan

[73] Assignee: Nippon Snaso Corporation, Tokyo, Japan

[21] Appl. No.: 852,069

[22] Filed: Mar. 16, 1992

[51] Int. Cl.⁵ .................... F16K 24/00; F16K 31/44
[52] U.S. Cl. ................. 137/312; 251/335.2; 251/367
[58] Field of Search ............... 137/312, 375; 251/335.2, 367; 222/131, 183

[56] References Cited

U.S. PATENT DOCUMENTS

| | | | |
|---|---|---|---|
| 3,315,700 | 4/1967 | Greenwood | 137/375 |
| 3,471,122 | 10/1969 | Nelson | 137/375 X |
| 4,671,490 | 6/1987 | Kolenc et al. | 251/335.2 |
| 5,002,086 | 3/1991 | Linder et al. | 137/312 |

Primary Examiner—Martin P. Schwadron
Assistant Examiner—Kevin L. Lee
Attorney, Agent, or Firm—Armstrong, Westerman, Hattori, McLeland & Naughton

[57] ABSTRACT

A valve unit installed in the pipeline equipped with double tubes. A valve body has an inlet passage, an outlet passage and a valve chamber. An inner tube of an inlet double tube is welded to the inlet passage of the inlet double tube, and an outer tube of the inlet double tube is secured to the valve body. The outlet double tube is also attached to the valve body. A cover is welded to the valve body, the inlet double tube and the outlet double tube. Passages are provided for leading leaked gas from the valve chamber to conduits formed between the outer tube and the inner tube of the inlet double tube and the outlet double tube.

3 Claims, 2 Drawing Sheets

VALVE UNIT FOR PIPELINE EQUIPPED WITH DOUBLE FLOW TUBE

FIELD OF THE INVENTION

This invention relates to a valve unit provided with a gas leakage preventing mechanism.

BACKGROUND OF THE INVENTION

In pipe lines to handle hazardous gas, for example poisonous, inflammable or corrosive gas for making semiconductors, double tube having inner tube and outer tube is used for preventing gas leakage.

Valve unit used in such pipe lines is also required to have gas leakage preventing mechanism.

FIG. 2 shows a conventional valve unit of this type, as manufactured and sold by Valex Corporation, 6080 Leland Street, Ventura, Calif.

In the piping P, double tube 3 having an inner tube 1 and an outer tube 2 is used. In the inner tube 1, hazardous gas flows, while vacuum is applied to the conduit 2a formed between the inner tube 1 and the outer tube 2, or an inert gas of nitrogen gas and such like flows in the conduit 2a.

A valve unit installed in the piping P, a cover casing 5 for covering the valve unit 4 is used for preventing hazardous gas leakage to the environment.

The cover casing 5 is composed of an under body 5a and an upper body 5b. Apertures 5d formed in the under body 5a are welded to the outer tubes 2,2 of the double tubes 3,3.

The upper body 5b has an aperture through which a valve shaft 4a of the valve unit 4 is assembled with seal rings 4d. On top of the valve shaft 4a is attached a knob 4b for controlling the valve unit 4.

Under body 5a and upper body 5b are tightened together with a fastener 6 with proper seal means.

In case of the leakage of the hazardous gas from the valve unit 4, the gas will fill in the cover 5. Then the gas filled in the cover 5 is lead to the conduit 2a of the double tube 3, and sent to a device to handle the hazardous gas.

In this type of conventional valve unit, all the valve body is covered by the cover, thereby the size of the valve unit becomes incompact.

DISCLOSURE OF THE INVENTION

This invention provides a compact valve unit installed in a gas pipeline equipped with double tube. The valve unit comprises a valve body having an inlet passage connected to an inner tube of an inlet double tube, an outlet passage connected to an inner tube of an outlet double tube, and a valve chamber.

In the valve body, a tappet to open and close the valve chamber, and a valve shaft connected to a handle to control the tappet are provided. Between the tappet and the valve shaft, a diaphragm is installed. A cover for covering the inlet double tube, the outlet double tube and the valve body is attached.

In the valve body, a passage for connecting the chamber for the leaked gas to a chamber formed inside the cover is formed. Passages connecting the chamber inside the cover to conduits formed between the inner tube and the outer tube of the inlet double tube and the outlet double tube are provided.

BEST MODE FOR CARRYING OUT THE INVENTION

Figure 1:
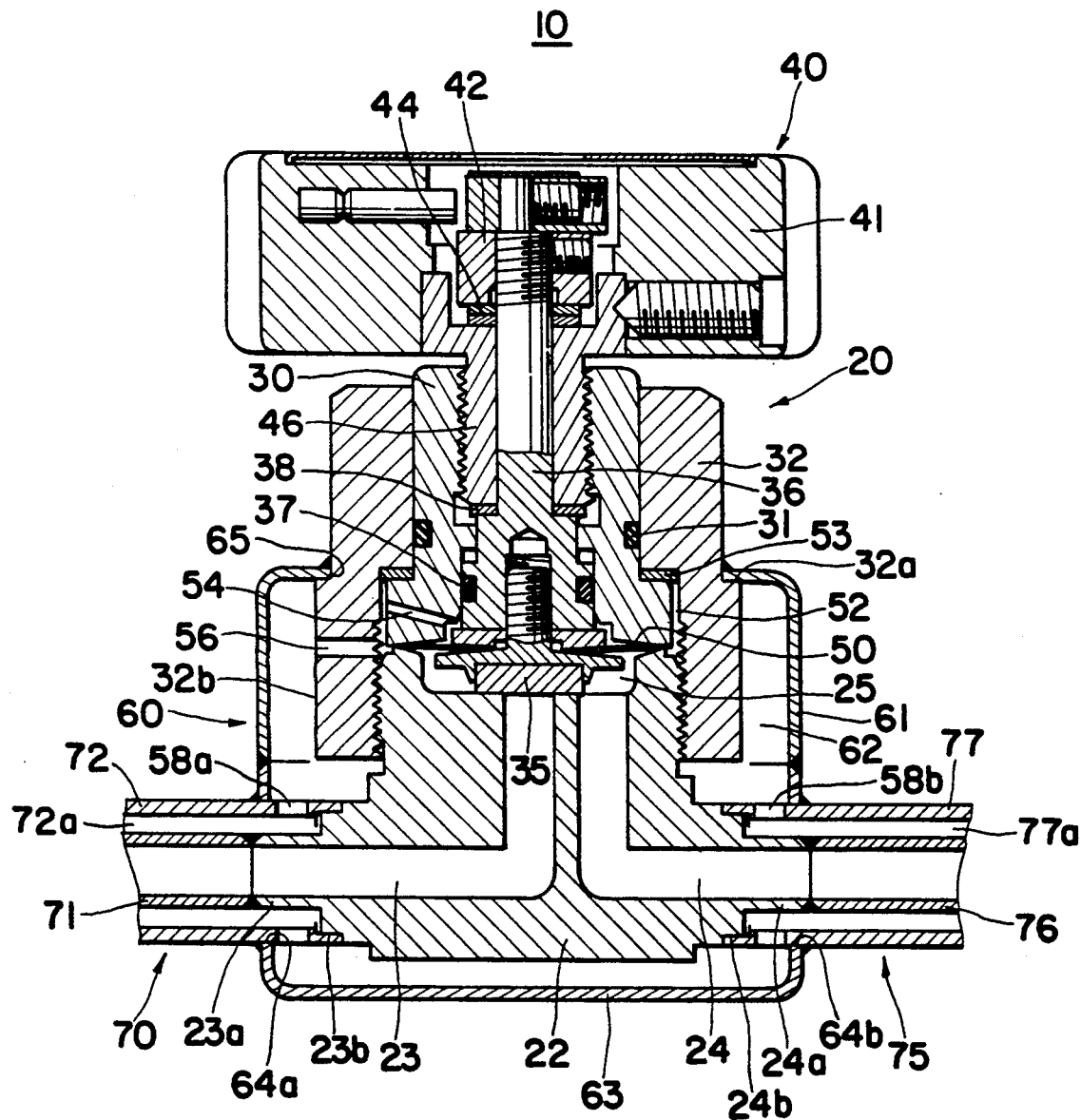
FIG. 1 illustrates a mechanical apparatus of the invention.
Figure 2:
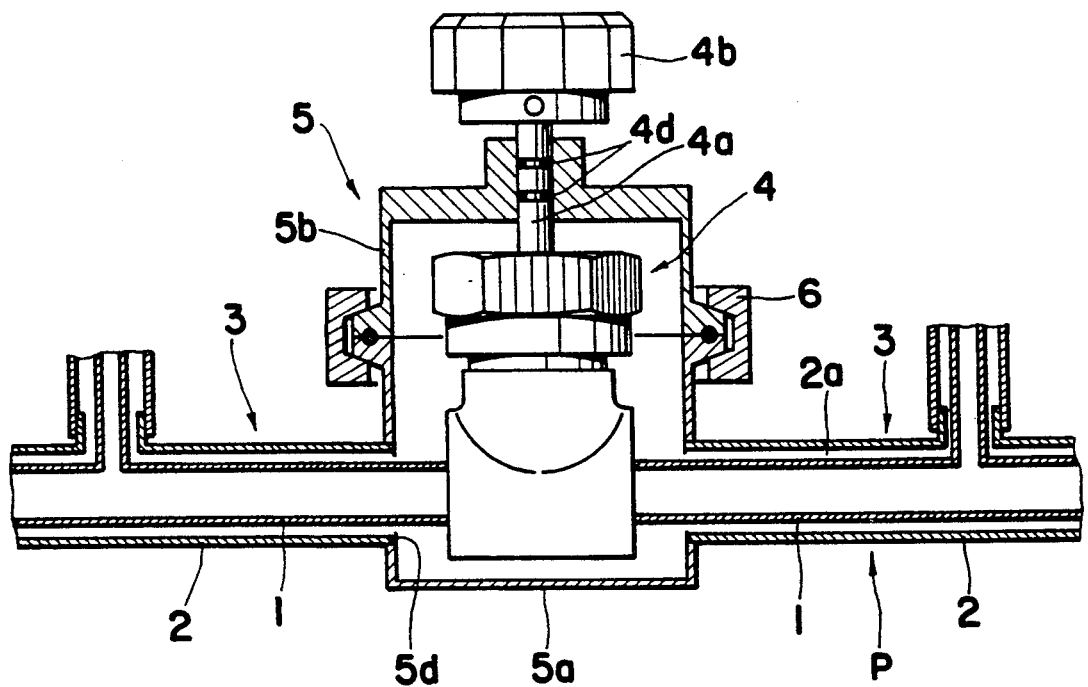
FIG. 2 shows a conventional valve unit.

FIG. 1 shows an embodiment of the present invention.

A valve unit 10 of the invention is provided a valve assembly 20 with a cover 60 and a pair of double tubes 70,75 connected to the valve assembly 20. The valve assembly 20 comprises a valve body 22 having an inlet passage 23 and an outlet passage 24, a bonnet 30 attached to the valve body 22 and a bonnet nut 32 fastened to the valve body 22.

A valve chamber 25 is formed between the valve body 22 and the bonnet 30. In the valve chamber, a tappet 35 is provided against the outlet port of the inlet passage 23 of the valve body 22. The tappet 35 is connected to a shaft 36 which operates the tappet by a handle 40.

A diaphragm 50 is provided between the valve chamber 25 and the bonnet 30 for sealing the valve chamber 25.

An inlet tube 23a of the inlet passage 23 of the valve body 22 is formed as the same size as the inner tube 71 of the inlet double tube 70. A flange 23b is formed on the outer portion of the valve body 22 to receive the outer tube 72 of the inlet double tube 70.

Consequently, an outlet tube 24a of the outlet passage 24 of the valve body 22 is formed as the same size as the inner tube 76 of the outlet double tube 75. A flange 24b is formed on the outer portion of the valve body 22 to receive the outer tube 77 of the outlet double tube 75.

Between the bonnet 30 and the bonnet nut 32 is provided an overflow chamber 52 to receive leaked gas from the valve chamber 25.

A seal ring 31 and a thrust washer 53 are fastened between the bonnet 30 and the bonnet nut 32 for sealing the overflow chamber 52.

A flange 32a is formed on the outer surface of the cylindrical bonnet nut 32 for receiving the upper end 65 of the cover 60.

The handle 40 of the valve unit 20 comprises a knob 41 and a stem 46. The stem 46 is screwed to the bonnet 30. The valve shaft 36 through the inner bore of the stem 46 is fastened to the knob 41 by a sleeve 44 and a rocking nut 42.

By the mechanism described above, rotating the knob 41 with the stem 46 moves the valve shaft 36 to open or close the tappet 35 without rotating the valve shaft 36.

In the bonnet 30 is formed at least one passage 54 connecting between the inside of the bonnet 30 and the leaked gas chamber 52.

A seal ring 37 is provided between the inner surface of the bonnet 30 and the valve shaft 36.

In the larger cylindrical body portion 32b of the bonnet nut 32, at least one passage 56 is provided to connect the leaked gas overflow chamber 52 and a covered chamber 62 formed in the cover 60.

The cover 60 is divided for an upper body 61 and an under body 63 to form the covered chamber 62 inside the cover body 61,63.

The upper cover 61 has an aperture 65 secured to the flange 32a of the bonnet nut 32. The under cover 63 has two apertures 64a, 64b, each secured to the outer tube 72 of the inlet double tube 70 and the outer tube 77 of the outlet double tube 75.

Passages 58a are opened on the outer tube 72 of the inlet double tube 70 for connecting the covered chamber 62 to a conduit 72a formed between the outer tube 72 and the inner tube 71 of the inlet double tube 70.

Passages 58b are opened on the outer tube 77 of the outlet double tube 75 for connecting the covered chamber 62 to a conduit 77a formed between the outer tube 77 and the inner tube 76 of the outlet double tube 75.

To assemble this valve unit 10, in the first step, said inner tube 71, 76 are welded to the inlet tube 23a and outlet tube 24a of the valve body 22. Secondly, pushing the outer tube 72 of the inlet double tube 70 into the flange 23b, and the outer tube 77 of the outlet double tube 75 into the flange 24b of the valve body 22, then, welding the outer tubes 72, 77 to the apertures 64a, 64b of the under cover 63.

After welding both ends of the upper cover 61 to the flange 65 of the bonnet nut 32 and the under cover 63, the handle knob 41 is attached to the stem 46 to complete the assembly.

By the mechanism of the present valve unit 10, even in case the diaphragm 50 is damaged, hazardous gas leaking out toward the valve shaft 36 is lead through the passage 54 of the bonnet 30 and the passage 56 of the bonnet nut 32 to the covered chamber 62. Then, the gas is lead to each conduit 72a or 77a through holes 58a, 58b, thereby preventing the leaking of the hazardous gas to the environment.

The valve shaft 36 is sealed in the valve casing, secure sealing is formed with a short length valve shaft. The cover is formed in a compact size to cover the valve body only.

Both inner tube and outer tube of the double tube are welded to the valve unit, rigid assembly is formed to bear with the torque force applied to the handle knob 41.

We claim:

1. A valve unit installed in a gas pipeline equipped with double tube comprising:

a valve body having an inlet passage connected to an inner tube of an inlet double tube, an outlet passage connected to an inner tube of an outlet double tube and a valve chamber;

a tappet to open and close the valve chamber;

a valve shaft connected to a handle to control the tappet;

a diaphragm installed between the tappet and the valve shaft;

a chamber formed in the valve unit for collecting gas leaking from the valve chamber;

a cover for covering the inlet double tube, the outlet double tube, and the valve body;

a passage formed in the valve body for connecting the chamber for the leaked gas to a chamber formed inside the cover; and passages connecting the chamber inside the cover to conduits formed between the inner tube and the outer tube of the inlet double tube and the outlet double tube.

2. The valve unit of claim 1 wherein;

the gas controlled by the valve unit is a hazardous gas.

3. The valve unit of claim 1 further comprising:

sealing means for preventing gas leakage from the valve chamber to the environment.

* * * * *